United States Patent Office 3,132,271
Patented May 5, 1964

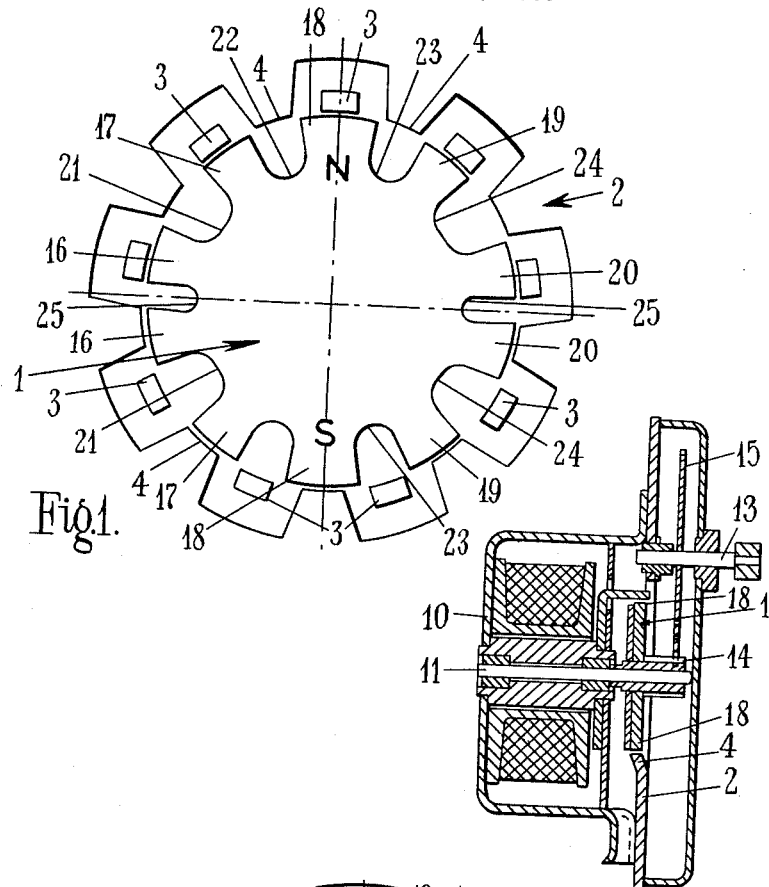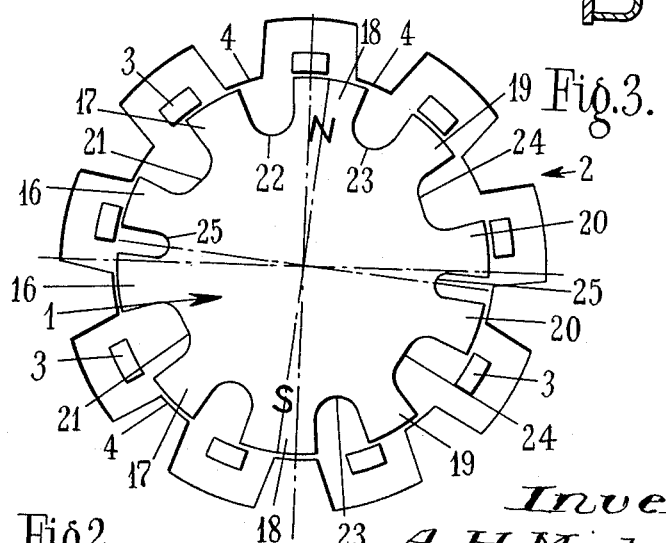

3,132,271
ALTERNATING CURRENT SYNCHRONOUS
ELECTRIC MOTORS
Albert Henry Midgley, "Brookside," Thornhill Road,
Moor Park, Northwood, Middlesex, England
Filed Oct. 10, 1960, Ser. No. 61,510
Claims priority, application Great Britain Oct. 26, 1959
7 Claims. (Cl. 310—162)

This invention relates to alternating current synchronous electric motors and more particularly to synchronous electric motors for use with clocks, timers, and other apparatus.

The object of the invention is to provide an improved form of synchronous electric motor which has a higher torque and greater efficiency than that provided by previous comparable arrangements and which has a compact construction, small overall dimensions and can be manufactured at low cost.

The invention is mainly applicable to a self-starting synchronous motor of the kind in which the rotor is in the form of a permanent magnet having two poles only, and the stator field includes two sets of annularly arranged, interspersed field poles of opposite instantaneous polarity.

The invention accordingly consists in a synchronous electric motor of the kind referred to in the preceding paragraph, wherein each rotor pole is so arranged as to span the polar area of approximately one half of the stator field and is itself divided or split into a plurality of sub-poles in such a way that the rotor assumes an idle position of minimum reluctance when the field is de-energized and will immediately start into rotation when the field is energized.

According to the preferred arrangement, each of the aforesaid rotor poles is divided or split into a plurality of sub-poles by a set of slots cut radially inwards from its outer edge and so arranged about the magnetic axis of the rotor that the angle subtended between any two adjacent slots at the axis of rotation is equivalent to or less than the polar angle between two field poles of the stator of like polarity.

The invention will be more completely understood from the following detailed description, which is given in conjunction with the accompanying drawings in which:

FIGURE 1 is a front view of the rotor and part of the field structure of a self-starting synchronous motor constructed in accordance with the invention, the rotor being shown in the position of maximum torque;

FIGURE 2 is a similar view to that shown in FIGURE 1, but in which the rotor is shown in the stopped position; and FIGURE 3 is a sectional side view of the motor to a reduced scale.

Referring now to these drawings, the motor is mounted in a substantially cylindrical shaped casing 10, and comprises a rotor 1 which is constructed in the form of a permanent magnet mounted on a shaft 11, and a stator or field structure 2, which includes two sets of annularly arranged interspersed field poles of opposite instantaneous polarity, The rotor shaft 11 is mounted coaxially with respect to the field structure 2, and drives the output shaft 13 through a set of gears 14 and 15. The rotor 1 is formed of a permanent magnet material having a north and south pole and each pole is so arranged as to span approximately the maximum polar area of one half of the stator field poles. Each rotor pole is divided into five sub-pole 16, 17, 18, 19, 20 by four slots 21, 22, 23, 24 cut radially inwards from its outer edge, and the widths of these sub-poles and slots are so arranged that the span of the centre sub-pole 18 is greater than the span of the stator pole 3 opposite to it, and the span of each of the other sub-poles 16, 17, 19, 20 is also greater than that of a stator pole 3 but less than that of the centre sub-pole 18, and these sub-poles 16, 17, 19, 20 are so arranged that when the rotor is in the running position of maximum torque as shown in FIGURE 1, the edge of the face of each sub-pole furthest from the centre line of the rotor is approximately in line with the similar edge of the stator pole opposite.

Conveniently the radial angle spanned by each of the centre sub-poles 18 is 24°, while the angle spanned by each of the other sub-poles is 18°. The angle spanned by the slots 22 and 23 between the centre sub-pole 18, and the adjacent sub-poles 17 and 19 is 16°, while the angle spanned by the slots 21 and 24 between the sub-poles 16 and 17, and 19 and 20 is 22°, thus providing for a gap 25 of 8° on each side between the north and south poles of the rotor.

With this arrangement, when the rotor is in the position shown in FIGURE 1, the span of the centre sub-pole 18 will be equal on either side of the centre line of the rotor, but the polar angle between the centres of the sub-poles 17 and 19 on either side of the centre line of the rotor is less than the polar angle between the pole of similar polarity of the stator field opposite the said sub-poles. When the rotor is in this position, the maximum torque will be produced when the motor is running, and it will be unstable when at rest. When the rotor moves through approximately 6° however into the position shown in FIGURE 2, the centre line of the rotor will coincide with the edge of the stator pole instead of with the centre of that pole, and a minimum amount of reluctance will be produced with the result that the rotor will always stop in this position when the current is switched off, but will immediately start into rotation when the field is energized.

It is to be understood however, that the invention is not to be regarded as being limited to the particular arrangement described and illustrated which is given by way of example as being a convenient method of carrying the invention into effect. Thus it will be appreciated that although the arrangement as described and illustrated employs a stator field having nine pairs of poles, this may be modified to suit particular requirements, and a stator field may be employed having a greater or less number of pairs of poles, provided they add up to an odd number of pairs, the number of rotor sub-poles and their polar angles being modified to suit the number of pairs of stator poles chosen. It will also be appreciated that the angles spanned by the rotor sub-poles, and slots are those which are considered to give optimum results but that these angles also may be varied or modified to suit particular requirements.

I claim:

1. A self-starting alternating current synchronous electric motor comprising a two pole permanent magnet rotor and a stator field structure including an annular array of field poles of which adjacent ones are of opposite instantaneous polarity, each rotor pole spanning the polar area of approximately one-half of the stator field and being divided into a number of sub-poles not less than one-half the number of field poles by radially extending slots, the sub-poles being so arranged about the magnetic axis of the rotor that the angle subtended between the centers of any two adjacent sub-poles is less than the polar angle between the centers of two most adjacent field poles of the stator of like polarity, whereby the rotor assumes an idle position of minimum reluctance when the field is deenergized and will immediately start into rotation when the field is energized.

2. A self-starting alternating current synchronous electric motor according to claim 1 wherein the width of any one of the sub-poles is greater than the space between two adjacent field poles.

3. A self-starting synchronous electric motor according to claim 1, wherein the circumferential length of any one of said slots is no less than the width of any one pole of the stator.

4. A self-starting synchronous electric motor according to claim 1, wherein the width of any one of the said sub-poles is no less than the width of any one pole of the stator.

5. A self-starting synchronous electric motor according to claim 1, wherein the total number of the rotor sub-poles is one more than the number of pairs of poles of the stator field structure.

6. A self-starting alternating current synchronous electric motor comprising a two pole permanent magnet rotor and a stator field structure including an annular array of field poles of which adjacent ones are of opposite instantaneous polarity, each rotor pole spanning the polar area of approximately one-half of the stator field and being divided into a number of sub-poles not less than one-half the number of field poles by radially extending slots, the widths of said sub-poles and slots being so arranged that the span of the center sub-pole is greater than the span of the strator pole opposite thereto and the span of each of the other sub-poles is also greater than that of a stator pole, but less than that of the center sub-pole, said other sub-poles being so arranged that when the rotor is in the running position of maximum torque, the edge of the face of each sub-pole farthest from the center line of the rotor is substantially in line with the similar edge of the stator pole opposite thereto, whereby the rotor assumes an idle position of minimum reluctance when the field is de-energized and will immediately start into rotation when the field is energized.

7. A self-starting alternating current synchronous electric motor comprising a two pole permanent magnet rotor and a stator field structure including an annular array of field poles of which adjacent ones are of opposite instantaneous polarity, each rotor pole spanning the polar area of approximately one-half of the stator field and being divided into five sub-poles by four raidally extending slots, the widths of said sub-poles and slots being so arranged that the span of the center sub-pole is greater than the span of the stator pole opposite thereto and the span of each of the other sub-poles is also greater than that of a stator pole, but less than that of the center sub-pole, said other sub-poles being so arranged that when the rotor is in the running position of maximum torque, the edge of the face of each sub-pole farthest from the center line of the rotor is substantially in line with the similar edge of the stator pole opposite thereto, whereby the rotor assumes an idle position of minmum reluctance when the field is de-energized and will immediately start into rotation when the field is energized.

References Cited in the file of this patent

UNITED STATES PATENTS

| | | |
|---|---|---|
| 1,977,185 | Haydon | Oct. 16, 1934 |
| 2,691,112 | Clifford et al. | Oct. 5, 1954 |
| 2,735,952 | Merrill | Feb. 21, 1956 |
| 2,793,307 | Gallagher | May 21, 1957 |
| 2,794,137 | Faus et al. | May 28, 1957 |
| 2,823,327 | Kohlhagen | Feb. 11, 1958 |
| 2,985,778 | Fritz | May 23, 1961 |
| 2,997,612 | Jager | Aug. 22, 1961 |